US011216806B2

(12) United States Patent
Mossler et al.

(10) Patent No.: US 11,216,806 B2
(45) Date of Patent: Jan. 4, 2022

(54) SYSTEMS AND METHODS FOR PROVIDING CARD INTERACTIONS

(71) Applicant: Capital One Services, LLC, McLean, VA (US)

(72) Inventors: Lara Mossler, Farmville, VA (US); Aravindhan Manivannan, Henrico, VA (US); Baskar Dilli, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 225 days.

(21) Appl. No.: 16/526,149

(22) Filed: Jul. 30, 2019

(65) Prior Publication Data
US 2020/0090168 A1 Mar. 19, 2020

Related U.S. Application Data

(62) Division of application No. 16/135,954, filed on Sep. 19, 2018, now Pat. No. 10,395,244.

(51) Int. Cl.
*G06Q 20/38* (2012.01)
*G06Q 20/34* (2012.01)
*G06Q 20/40* (2012.01)

(52) U.S. Cl.
CPC ....... *G06Q 20/3821* (2013.01); *G06Q 20/352* (2013.01); *G06Q 20/3825* (2013.01); *G06Q 20/3829* (2013.01); *G06Q 20/4014* (2013.01)

(58) Field of Classification Search
CPC ............. G06Q 20/3821; G06Q 20/352; G06Q 20/3825; G06Q 20/3829; G06Q 20/4014;
(Continued)

(56) References Cited

U.S. PATENT DOCUMENTS 9,692,879 B1 * 6/2017 Lack ..................... H04L 63/08
10,055,715 B1 * 8/2018 Grassadonia ...... G06Q 20/4012
(Continued)

FOREIGN PATENT DOCUMENTS

WO         2010032215 A1      3/2010
WO    WO-2010032215 A1 *     3/2010      ........... G06Q 20/341
WO         2011089423 A2      7/2011

OTHER PUBLICATIONS

Anonymous: "Issuer and Application Security Guidelines," Aug. 31, 2018, https://www.emvco.com/terms-of-use/?u=wp-content/uploads/documents/EMV-swg-nh20r2a-Issuer-Security-Guidelines-for-1st-Gen-August2018.pdf.
(Continued)

*Primary Examiner* — James D Nigh
(74) *Attorney, Agent, or Firm* — Troutman Pepper Hamilton Sanders LLP; Christopher J. Forstner; John A. Morrissett

(57) ABSTRACT

A method including receiving a first application user credential associated with a user profile; comparing, for a first match, the first application user credential with a stored second application user credential, wherein the stored second application user credential is associated with a user identity; and responsive to finding a first match, verifying the user identity by performing the following: communicating with a card using near field communication; receiving a public key of a key pair of the card and cardholder identification information of an account holder of the card; instructing the card to generate a digital signature; receiving the digital signature from the card; verifying the digital signature using the public key; and comparing, for a second match, at least a portion of the user identity with at least a portion of the cardholder identification information.

20 Claims, 10 Drawing Sheets

(58) Field of Classification Search
CPC ............... G06Q 20/327; G06Q 20/322; G06Q 20/4097; G06Q 20/401; G06Q 20/409; G06Q 20/354; G06Q 20/382; G06Q 20/38215; G06Q 20/3278; G06F 21/35; G06F 21/32
USPC .......................................................... 705/76
See application file for complete search history.

(56) References Cited

U.S. PATENT DOCUMENTS

| | | | | |
|---|---|---|---|---|
| 10,165,440 | B2* | 12/2018 | Smith | H04L 63/0492 |
| 2008/0126260 | A1* | 5/2008 | Cox | G06Q 20/40145 |
| | | | | 705/67 |
| 2009/0191811 | A1* | 7/2009 | Griffin | G06Q 20/102 |
| | | | | 455/41.1 |
| 2012/0011063 | A1* | 1/2012 | Killian | G06Q 20/349 |
| | | | | 705/41 |
| 2013/0297933 | A1* | 11/2013 | Fiducia | H04L 63/0853 |
| | | | | 713/156 |
| 2015/0186887 | A1 | 7/2015 | Khan et al. | |
| 2015/0350171 | A1* | 12/2015 | Brumley | H04L 63/061 |
| | | | | 713/170 |
| 2016/0261411 | A1* | 9/2016 | Yau | H04L 63/0492 |
| 2016/0277388 | A1 | 9/2016 | Lowe et al. | |
| 2016/0307190 | A1* | 10/2016 | Zarakas | G06Q 20/3829 |
| 2018/0032994 | A1 | 2/2018 | Myers et al. | |
| 2018/0158042 | A1* | 6/2018 | Finch | G06Q 20/4014 |

OTHER PUBLICATIONS

Anonymous: "Tap to Activate Your Debit Card," Nov. 14, 2017, https://monzo.com/blog/2017/11/14/nfc-card-activation.
Partial European Search Report in related EP Application No. 19198300.6, dated Nov. 27, 2019.
Extended European Search Report in related EP Application No. 19198300.6, dated Feb. 25, 2020.
https://monzo.com/blog/2017/11/14/nfc-card-activation/; (Year: 2017).
EMV Issuer and Application Security Guidelines (Version 2.6, Aug. 2018, 78 pages) (Year: 2018).

* cited by examiner

SYSTEMS AND METHODS FOR PROVIDING CARD INTERACTIONS

CROSS REFERENCE TO RELATED APPLICATIONS

This application is a divisional of, and claims priority under 35 U.S.C. § 121 to, U.S. patent application Ser. No. 16/135,954, filed Sep. 19, 2018, the entire contents and substance of which is hereby incorporated by reference in their entirety.

FIELD

The presently disclosed subject matter relates generally to systems methods for providing interactions between a contactless device and a user device, and, more particularly, to systems and methods for authenticating a user and/or providing other account functions to a cardholder based on an authenticated communication between a contactless transaction card and a user device of the cardholder.

BACKGROUND

Activating many cards, and more specifically financial cards (e.g., credit cards), involve the time-consuming process of cardholders calling a telephone number or visiting a website and entering or otherwise providing card information. Further, while the growing use of chip-based financial cards provides more secure features over the previous technology (e.g., magnetic strip cards) for in-person purchases, account access still typically relies on log-in credentials (e.g., username and password) to confirm a cardholder's identity. However, if the log-in credentials are compromised, another person could have access to the user's account.

Accordingly, there is a need for both an improved method of activating a card and an improved authentication for account access.

SUMMARY

Aspects of the disclosed technology include systems and methods for providing authenticated cardholder access. Consistent with the disclosed embodiments, the systems and methods may utilize one or more computing devices, processors, web servers, account servers, and/or contactless devices (e.g., radio frequency identification (RFID) cards). A method may include an application executing on a computing device receiving a first application user credential associated with a user profile. A processor associated with the application compares the first application user credential with a stored second application user credential. The stored second application user credential is associated with a user identity (e.g., a user account or user profile). In response to finding a match, the user may be authenticated to access the application. In some embodiments, the user identity may be further verified (e.g., second or multi-factor authentication) via an authentication communication protocol between the computing device and a contactless device.

For example, in some embodiments, the authentication communication protocol may be established as part of a wireless communication between a transaction card (e.g., a credit card associated with the user) through the use of near field communication (NFC) with the computing device (e.g., a smartphone). The authentication communication protocol may include receiving a digital signature from the transaction card, verifying the digital signature, and comparing at least a portion of card information to user account information (e.g., comparing the user identity with at least a portion of cardholder identification information). In some embodiments, the authentication communication protocol may conform to an offline dynamic data authentication protocol or an offline combined data authentication protocol as part of an EMV standard. In some embodiments, the authentication communication protocol between the contactless device and a user computing device may include one or more steps that mimic an authentication protocol between a contactless transaction card and a point-of-sale device, except in the disclosed embodiments, the authentication protocol is not used to complete a payment transaction and does not require real-time online connectivity to an issuer of the transaction card. Furthermore, the example authentication communication protocol disclosed herein may be used as a form of authentication for a user associated with the computing device (as opposed to a point of sale device) as detailed herein. And because the example authentication communication protocol uses two NFC capabilities (e.g., READ and WRITE), the example techniques use dynamic data and public and private keys to validate the signatures and certificates of the card issuer, the card, the user, and the interaction between the transaction card and a user's computing device, as detailed below. The example embodiments are thus advantageous over other NFC techniques that use only READ capability to perform static data check methods, such as to obtain a primary account number (PAN) of a transaction card, and thus lack the security available via offline dynamic data authentication. Thus, the example embodiments uniquely take advantage of the strong security of offline dynamic data authentication techniques to establish an authentication communication protocol between a transaction card and a user's computing device to achieve a trusted form of authentication that may be used to activate a card, as a form of multifactor authentication, and/or to unlock other functionality of a mobile application.

A contactless device (e.g., card, tag, transaction card or the like) may use near field communications technology for bi-directional or uni-directional contactless short-range communications based on, for example, radio frequency identification (RFID) standards, an EMV standard, or using NFC Data Exchange Format (NDEF) tags. The communication may use magnetic field induction to enable communication between electronic devices, including mobile wireless communications devices. Short-range high frequency wireless communications technology enables the exchange of data between devices over a short distance, such as only a few centimeters.

In the present disclosure, authentication or verification of a contactless device based on the completion of an example authentication communication protocol between a contactless device and a user computing device may be a primary form of authentication or a secondary form of authentication. Furthermore, completion of an example authentication communication protocol between the contactless device and a user computing device may enable other functionality. For example, in some embodiments, a cardholder can activate a contactless card based on the example authentication communication protocol by tapping it against a user computing device (e.g., a mobile device) implementing a card reader. For example, the device may include a card reader antenna (e.g., an NFC antenna) which may send and receive information with a contactless card, and an application executing on the device may be configured to implement card reading capabilities with the card reader. Through NFC, a communication link is established between the contactless card and the application. After establishing the communication link, the card transmits cardholder data including a digital signature to the application. Based on the digital signature (e.g. upon authentication of the card), the application recogizes the card as belonging to a specific account server (e.g., associated with a specific customer account). The application communicates data associated with the card to the specific account server and requests activation of the card. The account server activates the card within its system and transmits an indicaton of the success of the activation to the application. The application then displays the status of the card activation to the user.

The contactless card may also be linked to user credentials to provide greater account access. A user may enter user credentials to log onto the application. The application verifies the user credentials by comparing, for at least a portion of a match, the user credentials to stored user credentials. Once verified, the user may access certain first-level user account options. For greater access and/or executing certain account functions, i.e., second-level user account options, second-factor authentication may be required. For example, the contactless card may be tapped against the user device while card-reading is enabled. The application may communicate with the card (e.g., through NFC). The application may receive cardholder data and/or a digital signature from the card, and the application compares the cardholder data to a user identity associated with the user. If the cardholder data corresponds to the user identity, the user may access second-level user account options.

In an example scenario, to log a user into an application, an application associated with a computing device (e.g., smartphone) receives a user's credentials. The user credentials could be, for example, biometrics data (e.g., fingerprint data, optical data, and/or facial recognition), an established gesture associated with the user, and/or a username and password combination. A processor associated with the application performs a check of the provided application user credentials against a stored application user credential. The first match allows the user access to first-level user account options (e.g., display of account balance, display of recent transactions). A second level of authentication may be required to access second-level user account options. The second level of authentication may involve the application communicating with a transaction card by using a card reader associated with the computing device. From the transaction card, the application receives cardholder identification information of an account holder of the transaction card. Using a certificate authority public key, the application extracts an issuer public key from the transaction card. The application uses the issuer public key to extract the card public key of a key pair. The application then instructs the transaction card to generate a digital signature by using a private key of the key pair of the transaction card. Using the card public key, the application verifies the digital signature. To perform second-factor authentication, the processor compares, for a second match, at least a portion of the user identity with at least a portion of the cardholder identification information. For example, the processor may compare the user's name from the user identity with the user's name associated with the cardholder identification information. Upon authentication, the application grants the user access to several second-level user account options including a payment transfer, a payment request, a personal identification number (PIN) change request, and an address change request.

Further features of the disclosed design, and the advantages offered thereby, are explained in greater detail hereinafter with reference to specific example embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. The disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
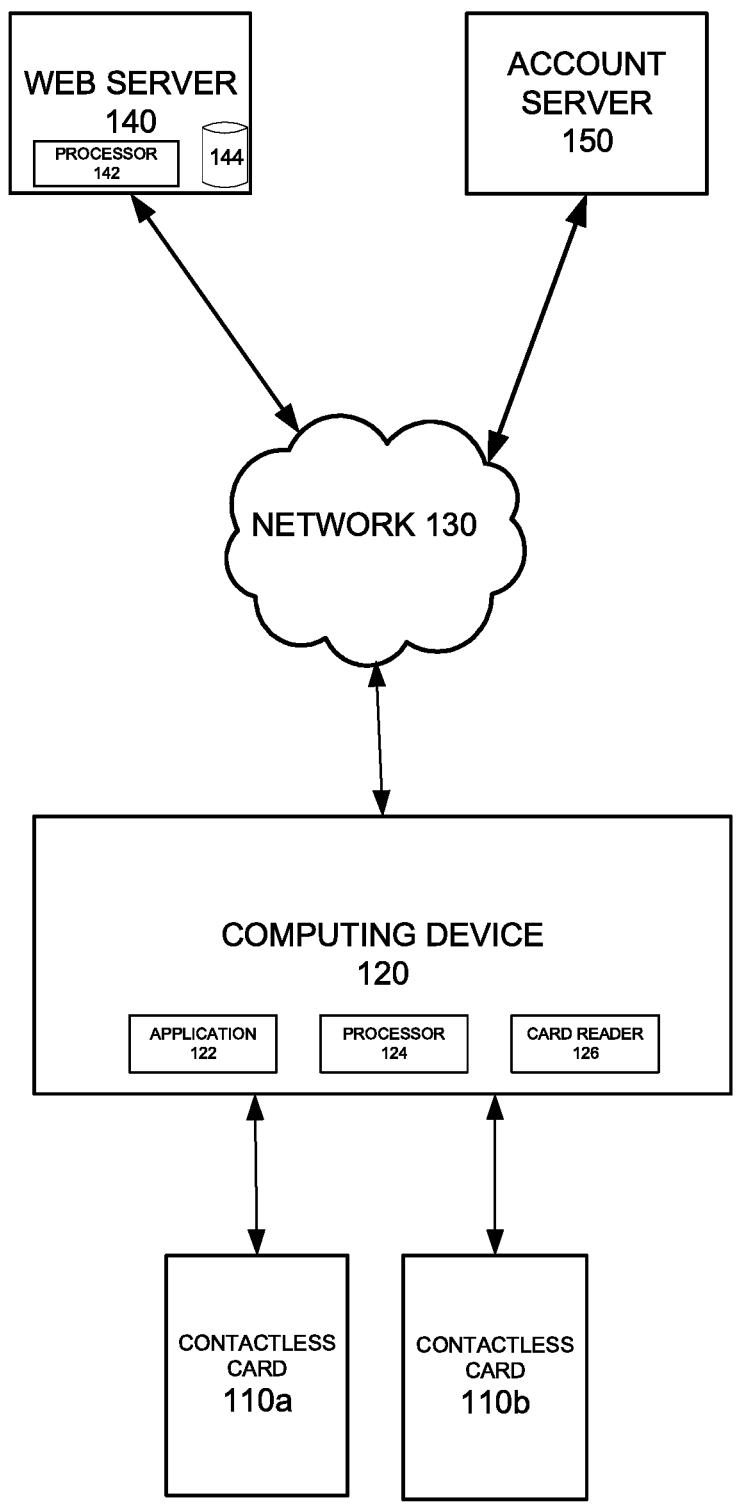
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 includes one or more contactless cards 110a and 110b, one or more computing devices 120 which include one or more applications 122 and one or more processors 124, a network 130, a web server 140 which may include a processor 142 and a database 144, and an account server 150 (e.g., a server of a card issuer or card manager). As non-limiting examples, the computing device 120 may be a personal computer, a smartphone, a laptop computer, a tablet, or other personal computing device. The network 130 may include a network of interconnected computing devices more commonly referred to as the internet. The web server 140 may include one or more physical or logical devices (e.g., servers). The computing device 120 may run and display one or more applications and the related output(s) of the one or more applications (e.g, through APIs) 122. The computing device 120 may include a card reader 126 or one or more components that may function to read from and/or communicate with a contactless card (e.g., a digital card reader). In conjunction with the one or more applications 122, the card reader 126 communicates with the one or more contactless cards 110a and 110b (e.g., RFID cards). An example computer architecture that may be used to implement one or more of the computing device 120, the account server 150 and the web server 140 is described below with reference to FIG. 8.

In certain implementations according to the present disclosure, the contactless card 110a and/or 110b includes a radio frequency identification chip enabled to communicate via near field communication (NFC) or other short-range communication protocols. In other embodiments, the contactless card 110a may communicate through other means including, but not limited to, Bluetooth, satellite, and/or WiFi. According to some embodiments, the contactless card 110a communicates with the card reader 126 through near field communication when the contactless card 110a is within range of the card reader 126. The contactless card 110a may send to the application 122 a certificate authority public key and cardholder identification information of an account holder. The cardholder identification information may include a personal identification number (PIN), a name of the user, an address, a date of birth, and/or the like. In response to instructions from the application 122, the contactless card 110a may extract the issuer public key from the contactless card 110a. The application 122 uses the issuer public key to extract the card public key of a key pair from the contactless card 110a. The application 122 may instruct the contactless card 110a to generate a digital signature using the card private key of the key pair. In some embodiments, the contactless card 110a may send the digital signature to the computing device 120.

Turning to the computing device 120, in some embodiments, the computing device 120 includes an application 122 and a processor 124. According to some embodiments, the application 122 receives, from a user, a first application user credential associated with a user profile. The first application user credential may include biometrics data, an established gesture associated with user recognition, a username and password combination, and/or the like. The processor 124 compares the first application user credential with a stored second application user credential. The stored second application user credential may be associated with the user identity. In some embodiments, the stored second application user credential is maintained on a web server 140 and the first match is performed by the web server 140. In some embodiments, upon determining a first match between the first application user credential and the stored second application user credential, the application 122 may grant the user access to one or more first-level user account options of a user account. The user account may be a financial account, a health insurance account, and/or any other account of the like associated with any service provider (e.g., a transit account, an entertainment account, etc.). The first-level user account options of a user account may include a display of an account balance, a display of recent transactions, and/or the like.

After determining the first match, in response to one or more actions associated with the application or an account, the computing device 120 may further verify the user identity by communicating with the contactless card 110a, and verifying the contactless card 110a corresponds to the user account. The application 122 may communicate with the contactless card 110a using short-range wireless communication (e.g., near field communication (NFC)). The application 122 may be configured to interface with a card reader 126 of computing device 120 capable of communicating with a contactless card. As should be noted, those skilled in the art would understand that a distance of less than twenty centimeters is consistent with NFC range.

In some embodiments, the application 122 communicates through an associated reader (e.g., card reader 126) with the contactless card 110a. The application 122 may receive, from the contactless card 110a, a public key of a key pair of the card and cardholder identification information of an account holder of the card. The cardholder identification information may include a personal identification number (PIN), a name of the user, an address, a date of birth, and/or the like. In response to instructions from the application 122, the contactless card 110a may extract the issuer public key from the contactless card 110a. The application 122 uses the issuer public key to extract the card public key of a key pair from the contactless card 110a. The application 122 may instruct the contactless card 110a to generate a digital signature using a private key of the key pair of the contactless card 110a. The computing device 120 verifies the digital signature using the card public key. The processor 124 compares at least a portion of the user identity with at least a portion of the cardholder identification information. In some embodiments, upon determining a second match between the user identity (e.g., the identity previously authenticated by application 122) and the cardholder identification information obtained from the contactless card, the application 122 grants the user access to one or more second-level user account options of a user account. According to some embodiments, the second-level user account options have a higher security requirement than the first-level user account options. As non-limiting examples, the second-level user account options of a user account may include a payment transfer, a payment request, a personal identification number (PIN) change request, an address change request, a card activation, and/or the like.

In some embodiments, card activation may occur without first-level user authentication. For example, a contactless card 110a may communicate with the application 122 through the card reader 126 of the computing device through NFC. The communication (e.g., a tap of the card proximate the card reader 126 of the computing device 120) allows the application 122 to read the data associated with the card and perform an activation. In some cases, the tap may activate or launch application 122 and then initiate one or more actions or communications with an account server (e.g., 150) to activate the card for subsequent use. In some cases, if the application 122 is not installed on computing device 120, a tap of the card against the card reader 126 may initiate a download of the application 122 (e.g., navigation to an application download page). Subsequent to installation, a tap of the card may activate or launch the application 122, and then initiate (e.g., via the application or other back-end communication) activation of the card. After activation, the card may be used in various transactions including commercial transactions.

According to some embodiments, the contactless card 110a is a virtual payment card. In those embodiments, the application 122 may retrieve information associated with the contactless card 110a by accessing a digital wallet implemented on the computing device 120, wherein the digital wallet includes the virtual payment card.

Figure 2:
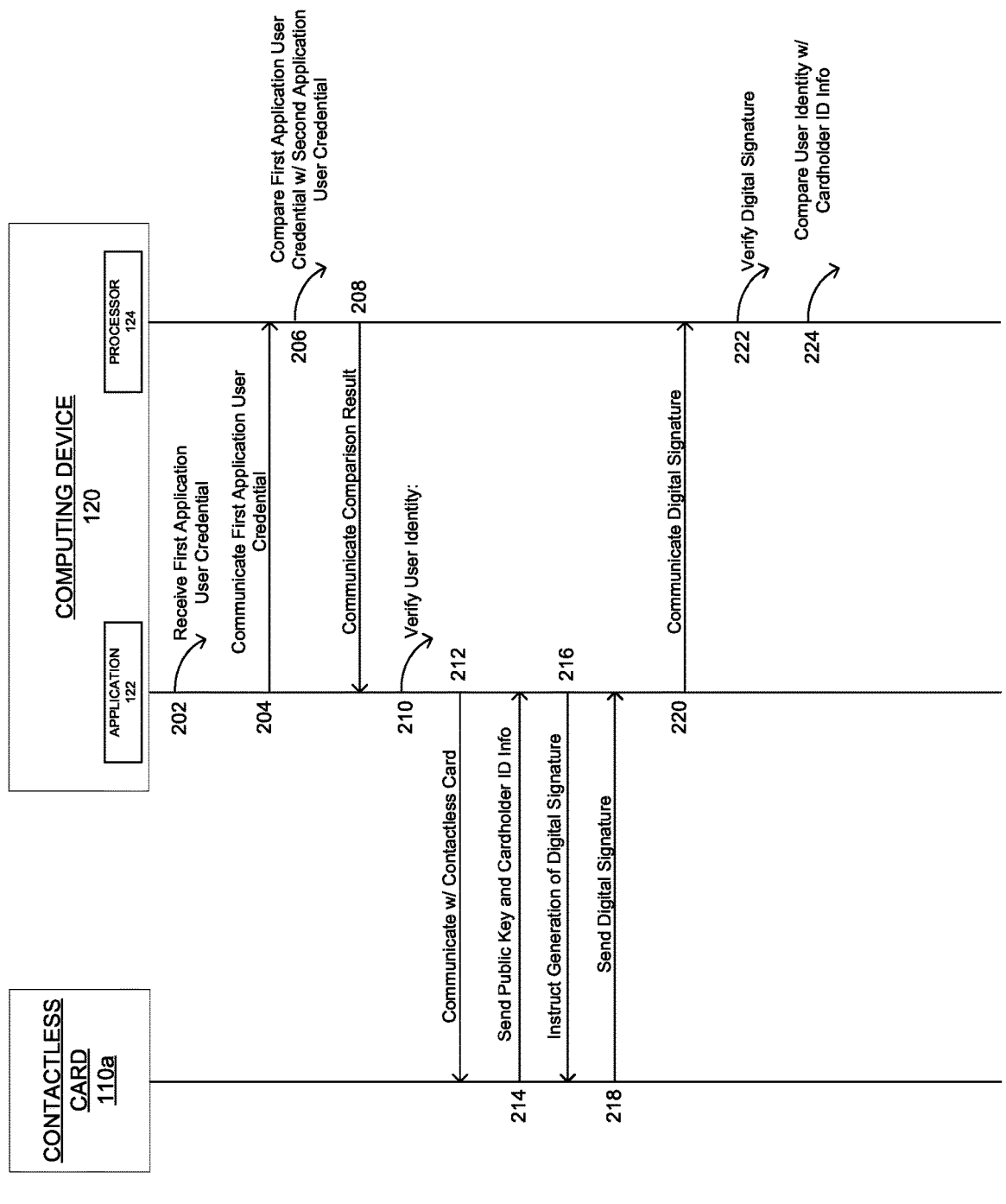
FIG. 2 is a timing diagram providing authenticated cardholder access according to an example embodiment.

FIG. 2 is a timing diagram illustrating an example sequence for providing authenticated cardholder access according to an example embodiment. According to some embodiments, at 202 the application 122 receives the first application user credentials. A user may provide the first application user credentials after receiving a prompt from the application 122. The first application user credentials may include biometrics data, an established gesture associated with user recognition, a username and password combination, facial recognition, and/or the like. At 204, the application 122 communicates the first application user credentials to the processor 124. The processor 124 compares the first application user credentials with stored second application user credential, at 206. The stored second application user credential may be located within a database associated with the computing device 120 or with application 120. In some embodiments, the stored second application user credential is maintained on a server (e.g., account server 150), the first application user credential is provided to the server, and the server compares the first application user credential to the stored second application user credential.

At 208, the processor 124 communicates the comparison result to the application 122 (e.g., for a match). In some embodiments, a first match grants the user access to first-level user account options of a user account (e.g., display of an account balance and/or recent transactions). Responsive to finding a first match, at 210, the application 122 initiates verifying the user identity. For example, the application 122 may output for display on the computing device 120 a notification to bring a contactless card 110a near the computing device 120. At 212, the application 122 communicates with the contactless card 110a (e.g., after being brought near the contactless card 110a). Communication between the application 122 and the contactless card 110a may involve the contactless card 110a being sufficiently close to the card reader 126 of the computing device to enable NFC data transfer between the application 122 and the contactless card 110a. At 214, the contactless card 110a sends, to the application 122, a public key of a public/private key pair and cardholder identification information of an account holder of the card. The application 122, at 216, instructs the contactless card 110a to generate a digital signature using a private key of the key pair of the card. In some cases, the cardholder identification information may be incorporated within the digital signature or otherwise conveyed with the digital signature.

At 218, the contactless card 110a sends the digital signature to the application 122. At 220, the application 122 communicates the digital signature with the processor 124. The processor 124, at 222, verifies the digital signature using the public key. For example, the card may provide a hash of the card's public key encrypted by a trusted source (e.g., a private key of a card provider), and verifying the digital signature may include: decrypting the encrypted hash (e.g., with a public key of the card provider); calculating a new hash of the digital signature; and comparing the decrypted original hash to the new hash for a match, at which point the card provider (e.g., issuer), and the transaction card may be authenticated. By using this READ and WRITE NFC capability to perform offline dynamic data authentication between a contactless card and a user's computing device, the example embodiments provide unique advantages that enable application 122 to more reliably (e.g., with greater security from counterfeiting or card skimming, or man in the middle attacks) authenticate a contactless card to be used as a form of multifactor authentication. As disclosed below in FIG. 10, communication between the application 122 and the contactless card 110a may include additional interactions. At 224, the processor 124 compares at least a portion of the user identity with at least a portion of the cardholder identification information. In some embodiments, a second match grants the user access to second-level user account options of a user account (e.g., a payment request, a payment transfer, a card activation, a personal identification number (PIN) change request, and an address change request). According to some embodiments, the second-level user account options represent more secured features of the application 122.

In some cases, verifying the digital signature may be performed by a server connected to the computing device. For example, processor 124 may output the digital signature for transmission to account server 150, and account server 150 may verify the digital signature.

Figure 3:
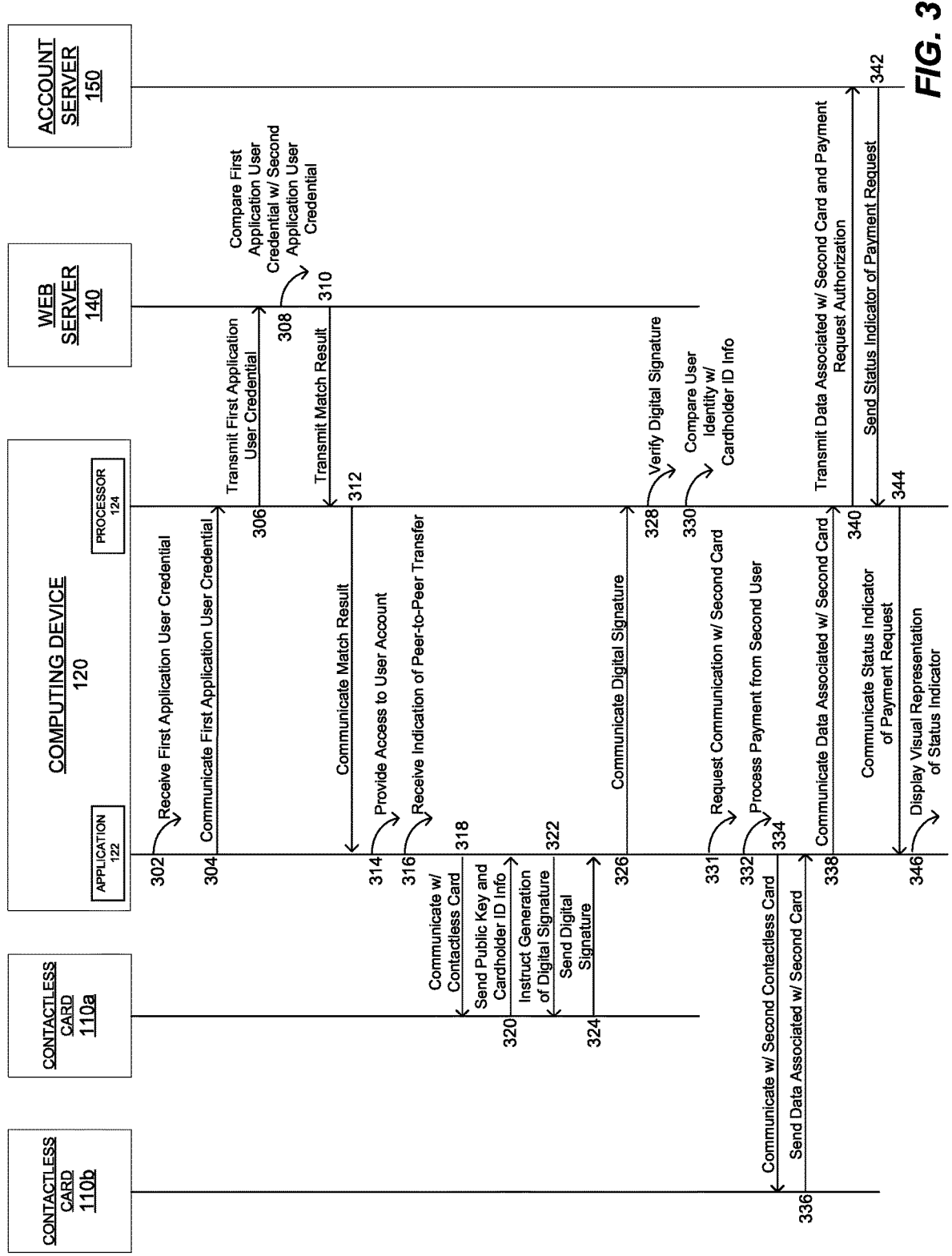
FIG. 3 is a timing diagram of peer-to-peer transfer according to an example embodiment.

FIG. 3 is a timing diagram of peer-to-peer transfer according to an example embodiment. In some embodiments, the application 122 may prompt a user for first application user credentials. At 302, the application 122 receives the first application user credentials. The first application user credentials may include biometrics data, an established gesture associated with user recognition, a username and password combination, facial recognition, and/or the like. The application 122 communicates the first application user credentials to the processor 124, at 304. At 306, the processor 124 transmits the first application user credentials to the web server 140. The web server 140, at 308, compares the first application user credentials to a second stored application user credential stored located on the web server 140 (e.g., to see if they match). At 310, the web server 140 transmits the match result to the processor 124. The processor 124, at 312, communicates the match result to the application 122. At 314, in response to a match being found, the application 122 provides access to the user account.

At 316, the application 122 receives an indication requesting a peer-to-peer transfer (e.g., an indication of a payor or a payee from the user account). For example, the user may select a request payment option. The peer-to-peer transfer may require authentication, such as requesting cardholder identification data for comparison to the user identity. At 318, the application 122 communicates with the contactless card 110a. Communication between the application 122 and the contactless card 110a may involve the contactless card 110a being sufficiently close to the card reader 126 of the computing device to enable NFC between the application 122 and the contactless card 110a. The contactless card 110a sends the public key of a public/private key pair and cardholder identification information to the application 122 at 320. At 322, the application 122 instructs the contactless card 110a to generate a digital signature using a private key of the key pair of the card. In some cases, the digital signature may include the cardholder identification information.

At 324, the contactless card 110*a* sends the digital signature to the application 122. At 326, the application 122 communicates the digital signature to the processor 124. The processor 124 verifies the digital signature at 328. At 330, the processor 124 compares (e.g., for a match), at least a portion of the user identity with at least a portion of the cardholder identification information. If the digital signature and cardholder identification are verified, at 331 the application 122 may request communication with a second transaction card from a second user.

In some embodiments the method may further include, at 332, processing the second transaction card (e.g., the other one of payor or payee) from the second user. At 332, the application processes the payment from the second user and requested by the first user. Processing the payment may involve communicating with the second contactless card 110*b* at 334. As mentioned above, communication between the application 122 and the second contactless card 110*b* may include the application 122 having access to card reader 126 (e.g., a digital reader) of the computing device 120, and the second contactless card 110*b* having an RFID chip. The contactless card 110*b* may be sufficiently close to the card reader 126 to enable near field communication therebetween. At 336, the second contactless card 110*b* sends data associated with the card to the application 122. The application 122 communicates the data associated with the second contactless card 110*b* to the processor 124 at 338. At 340, the processor 124 transmits the data associated with the second contactless card 110*b* and a payment authorization request to the account server 150. The account server 150 processes the payment request by either approving or denying the payment.

At 342, the account server 150 sends a status indicator of the payment request to the processor 124. The status indicator of the payment request may include an approved status indicator or a declined status indicator. At 344, the processor 124 communicates the status indicator of the payment request to the application 122. At 346, the application 122 displays a visual representation of the status indicator on the computing device 120.

Figure 4:
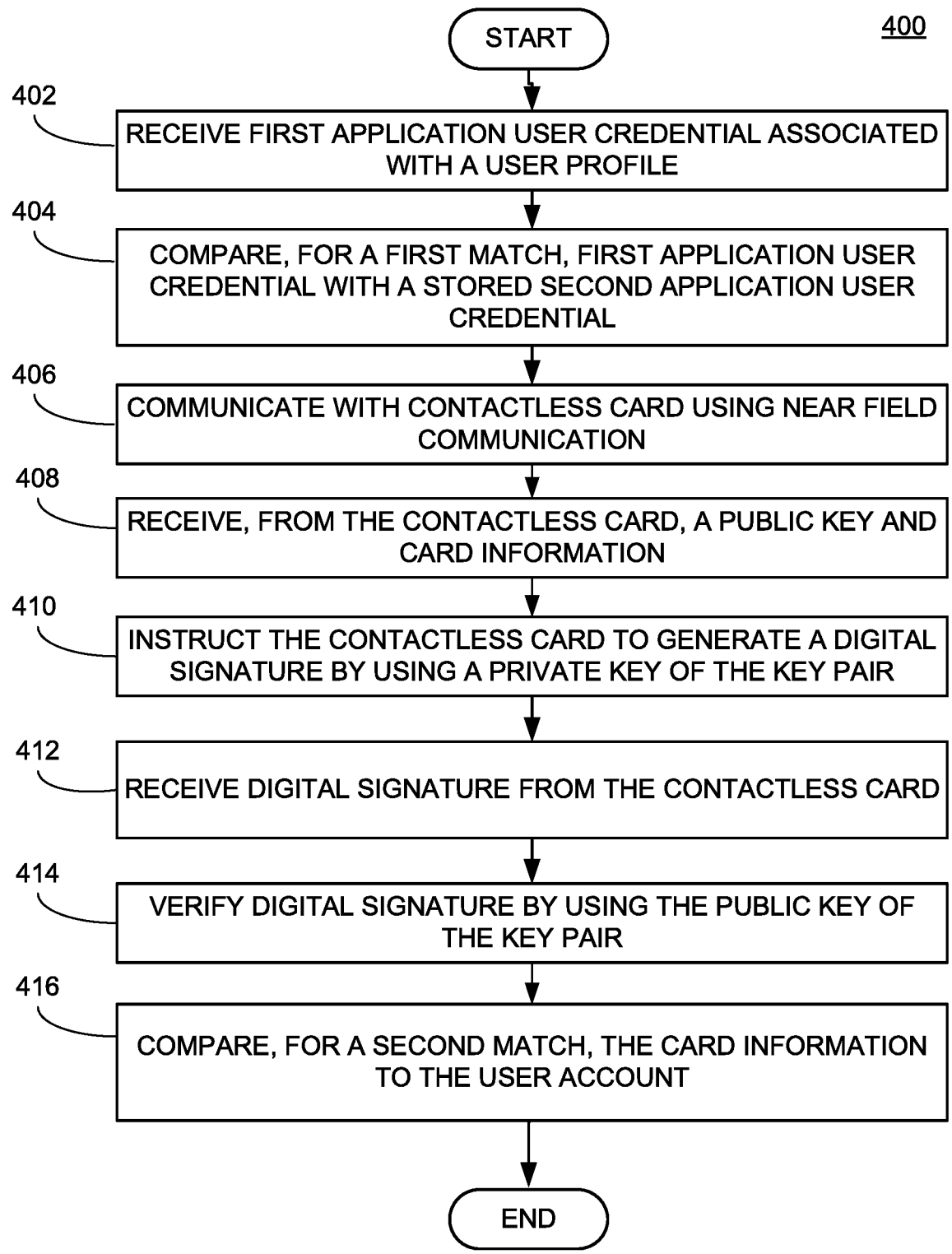
FIG. 4 is a flow chart of a method providing authenticated cardholder access according to an example embodiment.

FIG. 4 is a flow chart of a method providing authenticated cardholder access according to an example embodiment. At 402, the application 122 receives, from a user, a first application user credential associated with a user profile. As mentioned above, a user may provide the first application user credentials after receiving a prompt from the application 122. In some embodiments, the first application user credential may include biometrics data, an established gesture associated with user recognition, a username and password combination, and/or the like. At 404, the processor 124 compares the first application user credential with a stored second application user credential. The stored second application user credential may be associated with a user identity. The user identity may include a personal identification number (PIN), a name of the user, an address, a date of birth, and/or the like.

According to some embodiments, after finding a first match, the application 122 grants access to first-level user account options including a display of an account, a display of recent transactions, and/or the like. In response to finding a match, the computing device 120 verifies the user identity. At 406, the application 122 communicates with the contactless card 110*a*, for example, via an RFID chip in the contactless card 110*a*. The application 122 is associated with a card reader 126 allowing near field communication between the contactless card 110*a* and the application 122. At 408, the application 122 receives a public key of a public/private key pair of the card from the contactless card 110*a*. At 408, the application may also receive card information of the contactless card 110*a*. The card information may include cardholder information such as a personal identification number (PIN), a name of the user, an address, a date of birth, and/or the like. At 410, the application 122 instructs the contactless card 110*a* to generate a digital signature by using a private key of the key pair of the card. The contactless card 110*a* generates the digital signature, and the application 122 receives the digital signature from the contactless card 110*a* at 412. At 414, the computing device 120 verifies the digital signature by using the public key of the key pair of the card.

At 416, the processor 124 compares the card information to the user account. For example, processor 124 may compare the user identity to cardholder identification information. In some embodiments after verifying using the contactless card 110*a*, the application 122 grants access to second-level user account options including, as non-limiting examples, a payment request, a payment transfer, a card activation, a personal identification number (PIN) change request, an address change request, and/or the like. The second-level user account options may have a higher security requirement than the first-level user account options.

Figure 5:
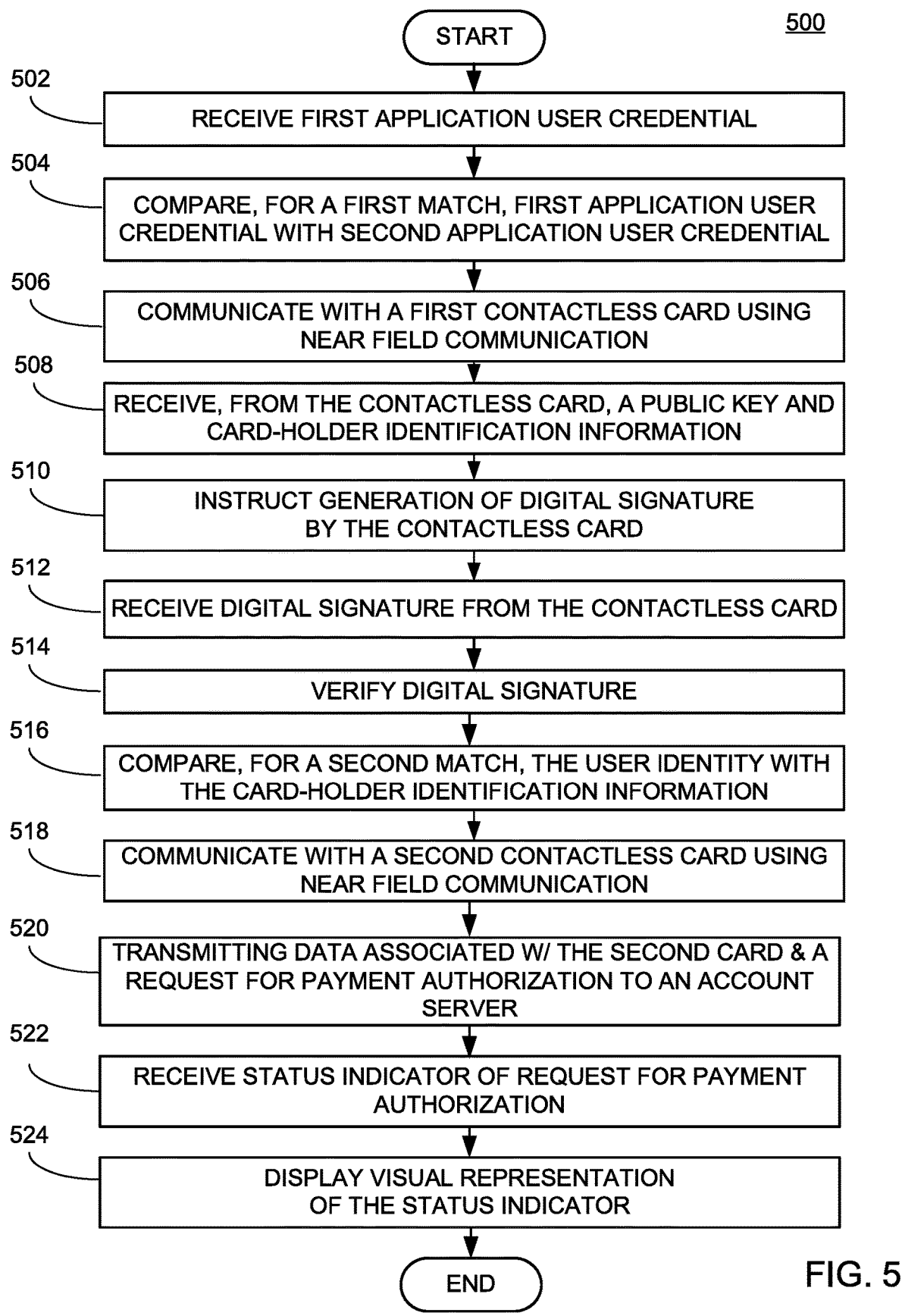
FIG. 5 is a flow chart of a method providing authenticated cardholder access according to an example embodiment.

FIG. 5 is a flow chart of a method providing peer-to-peer payments according to an example embodiment. Referring to FIG. 5, the method includes: receiving, by the application 122, a first application user credential at 502 from a user; and comparing, for a match, the first application user credential with a stored second application user credential at 504. These features may be substantially similar to the corresponding features described above with reference to FIG. 4.

In response to receiving a request for a peer-to-peer payment (e.g., an in-person exchange of funds), the method may further include: communicating with a first contactless card 110*a* using near field communication at 506; receiving, from the contactless card 110*a*, a public key of a key pair and card information at 508; instructing the contactless card 110*a* to generate a digital signature at 510; receiving the digital signature from the contactless card 110*a* at 512; verifying the digital signature at 514; and comparing, for a second match, at least a portion of the user identity with at least a portion of the cardholder identification information at 516. These features may be substantially similar to the corresponding features described above with reference to FIG. 4.

Once the first contactless card 110*a* is verified, a prompt may be displayed requesting communication with the second contactless card 110*b* (e.g., a card tap). At 518, the application 122 communicates with the second contactless card 110*b* using near field communication. Communication may involve receiving data from the second contactless card 110*b*. For example, computing device 120 may receive a digital signature, a public key and/or card information from the second contactless card 110*b* similar to that discussed with reference to the first contactless card 110*a*. At 520, the processor 124 may transmit data associated with the second contactless card 110*b* and a request for payment authorization to the account server 150. The account server processes the request for payment and/or receipt either approves or declines the payment. At 522, the computing device 120 receives, from the account server 150, a status indicator of the request for payment authorization. The status request indicator may be an approved status indicator or a declined status indicator. At 524, the application 122 displays a visual representation of the status indicator on the computing device 120.

Figure 6:
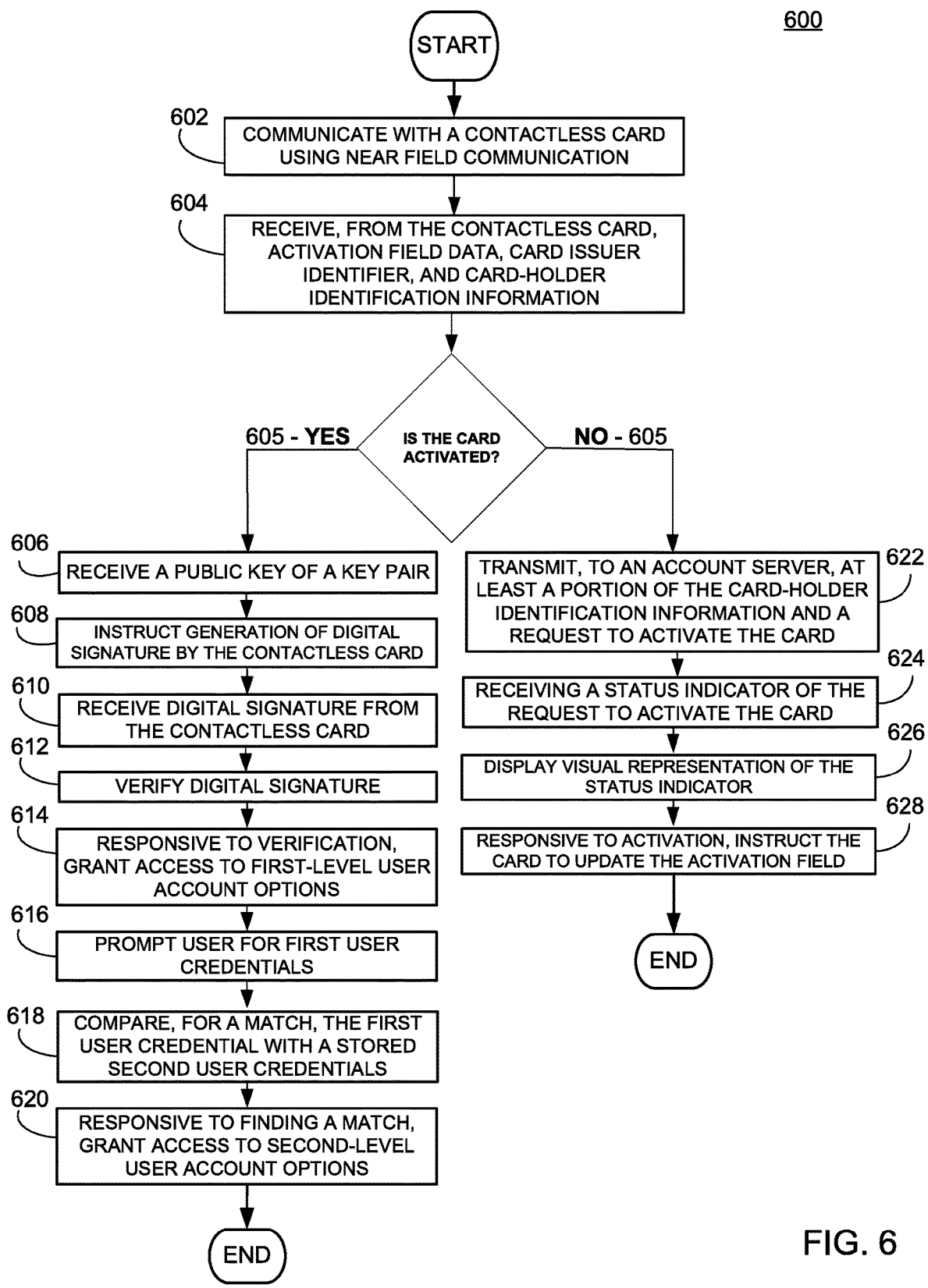
FIG. 6 is a flow chart of a method providing activation of a card according to an example embodiment.

FIG. 6 is a flow chart of a method for communicating with a contactless card according to an example embodiment. The method 600 may be executed, for example, by computing device 120, for example, implementing a card reader 126 (e.g., a reader application and a short-range antenna). At 602, the application communicates with the contactless card 110a through near field communications. At 604, the communications may involve the application 122 receiving, from the contactless card 110a, card information including one or more of an activation field, the card issuer identifier, and card-holder identification information. In some cases, application 122 may request specific data from contactless card 110a. The activation field indicates whether the contactless card 110a is active (e.g., whether the card is activated or inactivated). The card issuer identifier may represent an institution issuing or managing the contactless card 110a.

In response to receiving data indicating that contactless card 110a is activated (605-Yes), the application 122: receives, from the contactless card 110a, a public key of a key pair at 606; instructs generation of a digital signature by the contactless card 110a using a private key of the key pair of the card at 608; receives the digital signature from the contactless card 110a at 610; and verifies the digital signature using the public key at 612. The features described with reference to 606-612 may be substantially similar to the relevant functions described above with reference to 508-514 of FIG. 5.

In response to verification of the digital signature, at 614, the application 122 grants the user access to first-level user account options. At 616, in response to a user request for a second-level user account options (e.g., an attempt to transfer account assets), the application 122 may prompt the user for a first user credential (e.g., biometrics data such as fingerprint data, optical data, and/or facial recognition, an established gesture associated with the user, and/or a user-name and password combination). The processor 124 compares at least a portion of the first user credential and a stored second user credential at 618. The stored user credential may be located on the computing device 120 and/or on the web server 140. At 620, in response to finding a match, the application 122 grants the user access to the second-level user account options.

In response to determining the contactless card 110a is inactivated (605-No), computing device 120 may activate the contactless card 110a. For example, at 622, the computing device 120 transmits, to account server 150, at least a portion of the card information and a request to activate the contactless card 110a. The account server 150 processes the request to activate the card by either approving or denying activation of the card. Responsive to transmitting the activation request, at 624, the computing device 120 receives a status indicator of the request to activate the contactless card 110a from the account server 150. The status indicator may include an activated status indicator or a denied status indicator. At 626, the application 122 may display a visual representation of the status indicator. In some embodiments and as shown at 628, after the computing device 120 receives an activated status indicator, the application 122 may instruct the contactless card 110a to update the activation field to reflect the card as being activated.

In some embodiments, the contactless card 110a may send a predetermined digital signature and public key to the computing device 120 as the card information. The computing device 120 may transmit, to the account server 150, and request verifification of the predetermined digital signature. In some cases, computing device 120 may further transmit additional information (e.g., a network identifier, a device phone number or identification, other device information, etc.), which may be used as a validation check for activation, fraud prevention, higher security, and/or the like.

In some embodiments, a dedicated application 122 executing on computing device 120 may perform the activation of the contactless card 110a. In other embodiments, a webportal, a web-based app, an applet, and/or the like may perform the activation. Activation may be performed on the computing device 120, or the computing device may merely act as a go between for the contactless card 110a and an external device (e.g., acount server 150). According to some embodiments, in providing activation, the application 122 may indicate, to the account server 150, the type of device performing the activation (e.g., personal computer, smartphone, POS, or tablet). Further, the application 122 may output, for transmission, different and/or additional data to the account server 150 depending on the type of device involved.

According to some embodiments, prior to performing card activation the application 122 requires the user to enter the first user credential for a user profile. The processor 124 verifies the first user credential against a stored second user credential associated with the user profile. The stored second user credential may be located on the computing device 120 and/or stored on a web server 140. In response to the user logging onto the application 122, the application 122 may display a plurality of user options (e.g., display of account balance, display of recent transactions, a card-activation option). Responsive to a user selection of the card-activation option from amongst the plurality of user options, the application 122 may output for display a request to communicate with the contactless card 110a.

In some embodiments, the example authentication communication protocol may mimic an offline dynamic data authentication protocol of the EMV standard that is commonly performed between a transaction card and a point-of-sale device, with some modifications. For example, in the disclosed embodiments, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

Turning back to FIG. 6, in some cases, after activating the card, the method may transition to 606 and/or 616. Moreover, as would be understood by one of ordinary skill, the blocks may be performed in various orders, additional functions may be incorporated therebetween, and not all described functions may be performed in every embodiment.

Figure 7:
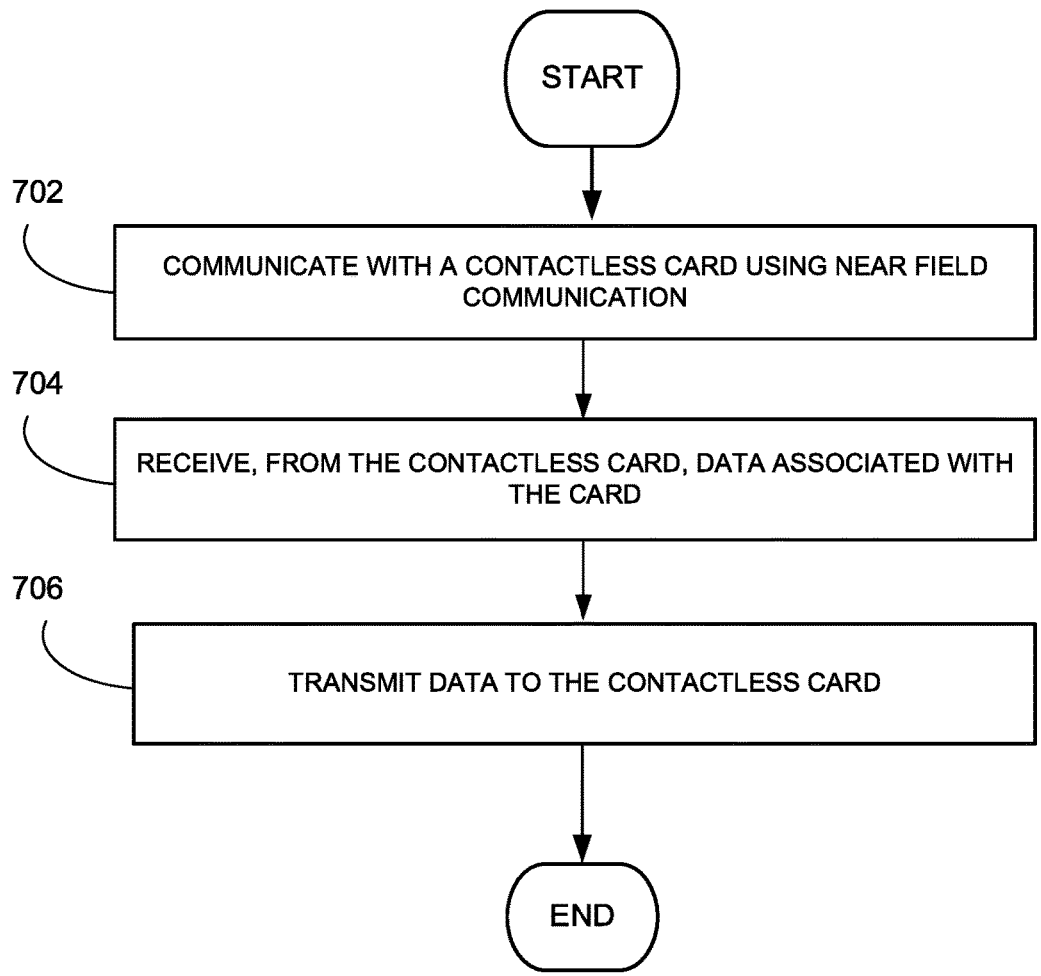
FIG. 7 is a flow chart of a method for pairing a card to a device according to an example embodiment.

FIG. 7 is a flow chart of a method for pairing a card to a device according to an example embodiment. According to some embodiments, an application 122 is enabled on a computing device 120. At 702, communication between the contactless card 110a and the application 122 begins when the contactless card is within an acceptable distance (e.g., less than twenty centimeters) of the card reader 126 associated with the application 122. For example, application 122 may establish a communication link with the contactless card 110a using an NFC standard. The computing device 120 receives, from the contactless card 110a, data associated with the card at 704. The data associated with the card may include an unextracted public key of a public/private card key pair of the card. The unextracted public key may be previously encrypted by an issuer of contactless card 110a using a private key of a public/private issuer key pair. The application 122 using the issuer public key may extract the card public key.

In some embodiments, based on the data received from the contactless card 110a, the computing device may verify the compatibility of the contactless card 110a with the application 122. For example, the computing device 120 may ensure only credit cards are paired with the application 122 as opposed to other devices using NFC (e.g., access cards, tracking scanners). In some embodiments, the data received from the contactless card 110a may be used to generate a virtual payment card as part of a digital wallet associated with the computing device 120.

At 706, the computing device 120 transmits data to the contactless card 110a. The data may include instructions to generate a digital signature using the private key of the key pair. Responsive to generation of the digital signature, the computing device 120 may receive the digital signature from the contactless card 110a. The contactless card 110a may be verified based on the digital signature and the public key of the public/private card key pair computing device 120. As detailed above, the use of this READ and WRITE NFC capability to perform offline dynamic data authentication between a contactless card and a user's computing device provide unique advantages that enable application 122 to more reliably (e.g., with greater security from counterfeiting or card skimming, or man in the middle attacks) authenticate the contactless card to be used as a form of multifactor authentication.

Figure 9:
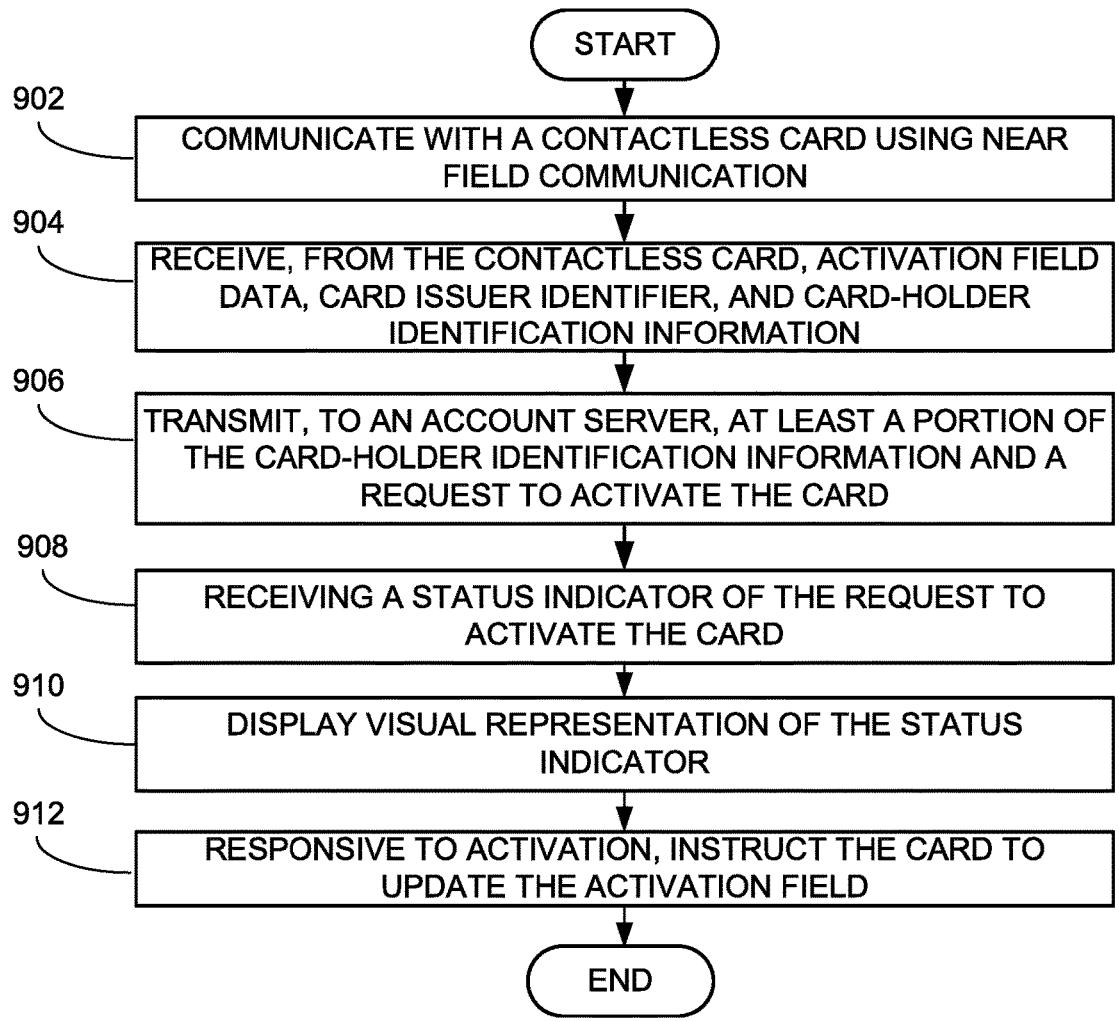
FIG. 9 is a flow chart of a method for activating a contactless card according to an example embodiment.

FIG. 9 is a flow chart of a method for activating a contactless card according to an example embodiment. According to some embodiments, an application 122 is enabled on a computing device 120. The application 122 communicates with the contactless card 110a using, for example, NFC at 902. At 904, the computing device 120 receives data from the contactless card 110a, which may include activation field data, a card issuer identifier, cardholder identification information, and/or the like. At 906, the processor 124 transmits, to an account server 150, at least a portion of the card-holder identification information and a request to activate the contactless card 110a. In some embodiments, based on the card issuer identifier, the processor 124 may determine a particular account server of a plurality of account servers to transmit data to. The processor 124 may receive a status indicator of the request to activate the card at 908. The status indicator may be an activated status indicator or a denied status indicator. At 910, the application 122 displays a visual representation of the status indicator. In some embodiments and as shown at 912, the application 122 may instruct the contactless card 110a to update the activation field.

Figure 10:
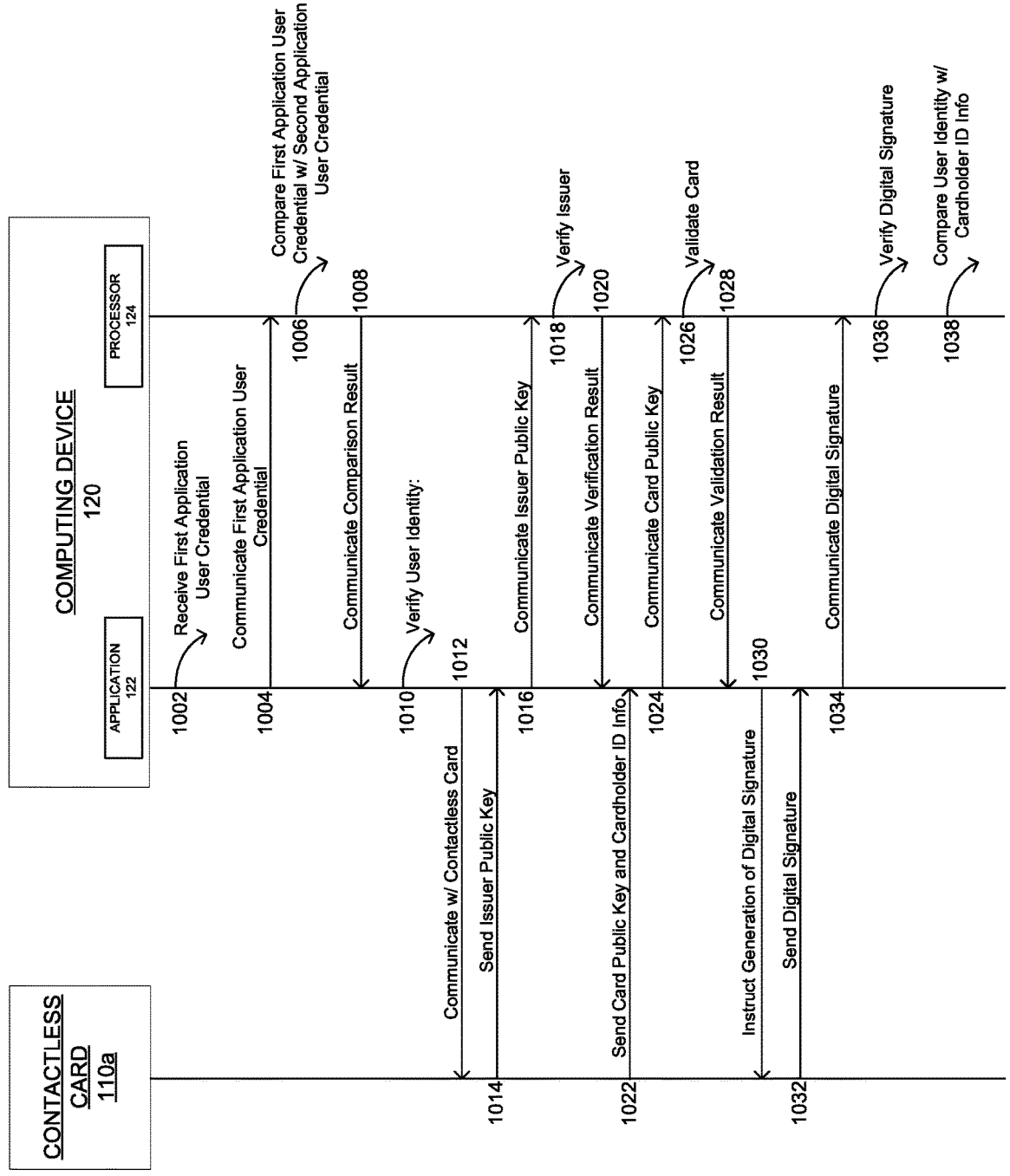
FIG. 10 is a timing diagram of authenticated cardholder access according to an example embodiment.

FIG. 10 is a timing diagram providing authenticated cardholder access according to an example embodiment. Referring to FIG. 10, the method includes: receiving, by the application 122, a first application user credential at 1002 from a user; communicating, by the application 122 and to the processor 124, the first application user credential at 1004; comparing (e.g., for a match), the first application user credential with a stored second application user credential at 1006; communicating the comparison result from the processor 124 to the application 122, at 1008; initiating, by the application 122, verification of the user identity at 1010; and communicating with the contactless card 110a at 1012. These features may be substantially similar to the corresponding features described above with reference to FIG. 2.

At 1014, in response to and the communication, the application 122 receives, from the contactless card 110a, an issuer public key of a key pair. The application 122 communicates the issuer public key to the processor 124 at 1016. Using the issuer public key, the processor 124 verifies the card issuer at 1018, (e.g., by decrypting certain static data certified by the card issuer using the issuer public key). In response to verifying the card issuer, at 1020, the processor 124 communicates the verification result to the application 122.

At 1022, the contactless card 110a sends the card public key of a card public/private key pair and cardholder identification information to the application 122. In some embodiments, the cardholder identification information and the card public key may be transmitted separately. At 1024, the application 122 communicates the card public key to the processor 124. At 1026, using the card public key, the processor 124 validates the card. The processor 124 communicates the validation result to the application 122, at 1028.

At 1030, the application 122 instructs the contactless card 110a to generate a digital signature using the card private key of the card public/private key pair. In response to generating the digital signature, the contactless card 110a sends the digital signature to the application 122, at 1032. At 1034, the application 122 communicates the digital signature to the processor 124. At 1036, the processor 124 verifies the digital signature. The processor 124 may use the card public key to verify the signature. Again, here, as detailed above, the implementation of the above READ and WRITE NFC capability to perform offline dynamic data authentication between a contactless card and a user's computing device (and/or application executing on the device) provide unique advantages that enable application 122 to more reliably (e.g., with greater security from counterfeiting or card skimming, or man in the middle attacks) authenticate the contactless card to be used as a form of multifactor authentication. At 1038, the processor 124 compares, for a second match, at least a portion of the user identity with at least a portion of the cardholder identification information. Subject to the second match, the user may be able to access second-level user account options.

Figure 8:
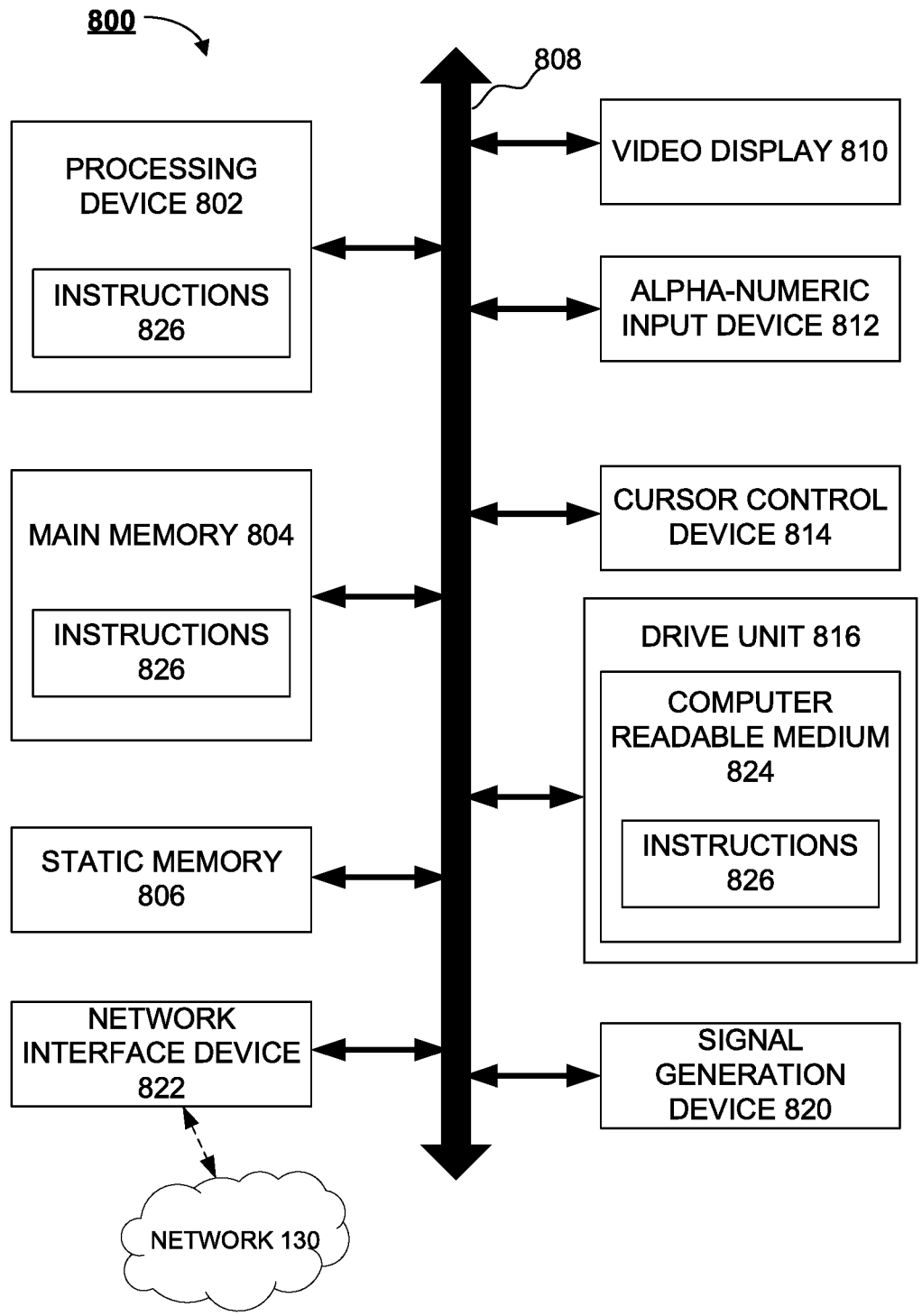
FIG. 8 is a block diagram of an example computer system that may implement certain aspects of the present disclosure.

FIG. 8 is a block diagram of an example computer system 800 that may implement certain aspects of the present disclosure. The computer system 800 may include a set of instructions 826 for controlling operation of the computer system 800. In some implementations, the computer system 800 may be connected (e.g., networked) to other machines in a Local Area Network (LAN), an intranet, an extranet, a satellite communications system, or the Internet. The computer system 800 may operate in the capacity of a server or a client machine in a client-server network environment, or as a peer machine in a peer-to-peer (or distributed) network environment. The computer system 800 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 800 is illustrated, the term "machine" shall also be taken to include any collection of machines (e.g., computers) that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random-access memory (DRAM) such as synchronous DRAM (SDRAM), etc.), a static memory 806 (e.g., flash memory, static random-access memory (SRAM), etc.), and a secondary memory 816 (e.g., a data storage device), which communicate with each other via a bus 808.

The processing device 802 represents one or more general-purpose processing devices such as a microprocessor, a microcontroller, a central processing unit, or the like. As non-limiting examples, the processing device 802 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the operations for electronically creating and trading derivative products based on one or more indices relating to volatility.

The computer system 800 may further include a network interface device 822, which is connectable to a network 130. The computer system 800 also may include a video display unit 810, i.e., a display (e.g., a liquid crystal display (LCD), a touch screen, or a cathode ray tube (CRT)), an alphanumeric input device 812 (e.g., a keyboard), a cursor control device 814 (e.g., a mouse), and a signal generation device 820 (e.g., a speaker).

The secondary memory 816 may include a non-transitory storage medium 824 on which is stored one or more sets of instructions 826 for the computer system 800 representing any one or more of the methodologies or functions described herein. For example, the instructions 826 may include instructions for implementing an asset tracking device including a power source and power management system or subsystem for a container or a trailer. The instructions 826 for the computer system 800 may also reside, completely or at least partially, within the main memory 804 and/or within the processing device 802 during execution thereof by the computer system 800, the main memory 804 and the processing device 802 also constituting computer-readable storage media.

While the storage medium 824 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASES

The following example use cases describe examples of particular implementations of the present disclosure. These are intended solely for explanatory purposes and not for purposes of limitation. In one case, a first friend (payor) owes a second friend (payee) a sum of money. Rather than going to an ATM or requiring exchange through a peer-to-peer application, payor wishes to pay via payee's smartphone (e.g., computing device 120). Payee logs-on to the appropriate application on his smartphone and selects a payment request option. In response, the application requests authentication via payee's credit card. For example, the application outputs a display requesting that payee tap his RFID credit card. Once payee taps his RFID credit card against the screen of his smartphone with the application enabled, the card is read and verified. Next, the application displays a prompt for payor to tap his RFID card to send payment. After the payor taps his RFID card, the application reads the card information and transmits, via an associated processor, a request for payment to payor's card issuer. The card issuer processes the transaction and sends a status indicator of the transaction to the smartphone. The application then outputs for display the status indicator of the transaction.

In another example case, a credit card customer receives a new credit card in the mail. Rather than activating the card by calling a provided telephone number associated with the card issuer or visiting logging into a website, the customer decides to activate the card via an application (e.g., application 122) on his smartphone (e.g., computing device 120). The customer selects the card activation feature from the application's menu. The application prompts the customer to tap his RFID credit card against the screen. Upon tapping the RFID credit card against the screen of the smartphone, the application communicates with a card issuer server and activates the customer's card. The application then displays a message indicating successful activation. The card activation is now complete.

In another example case, a customer wants to access his financial accounts on his mobile phone. The customer launches an application (e.g, a bank application) on the mobile device and inputs a username and password. At this stage, the customer may see first-level account information (e.g., recent purchases) and be able to perform first-level account options (e.g., pay credit-card). However, if the user attempts to access second-level account information (e.g., spending limit) or perform a second-level account option (e.g., transfer to external system) he must have a second-factor authentication. Accordingly, the application requests that a user provide a transaction card (e.g., credit card) for account verification. The user then taps his credit card to the mobile device, and the application verifies that the credit card corresponds to the user's account. Thereafter, the user may view second-level account data and/or perform second-level account functions.

What is claimed is:

1. A method for multi-level user authentication, the method comprising:
   receiving, by an application associated with a computing device, a first user credential from a user;
   determining that the first user credential matches a stored user credential, the stored user credential associated with a user identity of the account;
   verifying the user identity by:
      receiving, at the application, a public key of a key pair associated with a transaction card;
      instructing, by the application and via an antenna of the computing device configured to communicate with a radio frequency identification (RFID) chip in the transaction card using near field communication (NFC), the transaction card to generate a digital signature by using a private key of the key pair;
      receiving, at the application and via the antenna, the digital signature; and
      verifying, by the application, the digital signature using the public key;
   determining, by the application, to authenticate the user based on the verification of the digital signature and the first user credential matching the stored user credential;
   receiving, by the application, a card activation request from the user;
   sending, by the application, cardholder data and the card activation request to an account provider server; and
   receiving, by the application, a status of the card activation request, the status including activated or denied.

2. The method of claim 1, wherein the computing device is a mobile device associated with the user.

3. The method of claim 1,
   wherein the public key is received from the transaction card, and
   wherein receiving the public key further comprises:
      receiving, via the antenna, a certificate authority public key associated with the public key.

4. The method of claim 1, wherein the first user credential comprises at least one of biometrics data, an established gesture associated with user recognition, or a username and password combination.

5. The method of claim 1, wherein the user identity comprises at least one of a personal identification number (PIN), a name of the user, an address, or a date of birth.

6. The method of claim 1, further comprising:
   responsive to determining to authenticate the user, performing the following:
      sending, with the application, cardholder data and a card activation request to an account provider server;
      receiving, at the application, a status of the card activation request, the status including activated or denied, wherein an activated status of the transaction card corresponds to the transaction card being enabled for commercial transactions; and
      displaying, by the application, the status of the card activation request.

7. The method of claim 1 further comprising:
   responsive to determining that the first user credential matches the stored user credential, providing, through the application, access to one or more first-level user account options of a user account; and
   responsive to verifying the digital signature, providing, through the application, access to one or more second-level user account options of the user account.

8. The method of claim 7, wherein
   the user account is a financial account, and
   the one or more first-level user account options comprises at least one of a display of an account balance or display of recent transactions.

9. The method of claim 7, wherein
   the user account is a financial account, and
   the one or more second-level user account options comprises at least one of a payment transfer, a payment request, a personal identification number (PIN) change request, a card activation request, or an address change request, wherein an activated status of the transaction card corresponds to the transaction card being enabled for commercial transactions.

10. The method of claim 9, further comprising:
    displaying, by the application, the status of the card activation request.

11. The system of claim 1, wherein the first user credential is associated with a user of an account having an associated transaction card provided by an account provider.

12. A method for multi-level user authentication, the method comprising:
- logging a user onto an application associated with a computing device by:
  - receiving, at the application, a first user credential associated with a user profile of the user, the first user credential comprising at least one of: biometric data, a gesture, or a username and password combination; and
  - determining, with the application, that the first user credential matches a stored user credential;
- displaying, on the application, a plurality of user account options;
- receiving, at the application, a user selection of a first-level user account option;
- providing, via the application, access to the first-level user account option;
- receiving, by the application, a user selection of a second-level user account option;
- displaying a request to verify the identity of the user in response to the selection of the second-level user account option;
- verifying the identity of the user by:
  - receiving, by the application, card information from a virtual payment card by:
    - accessing, with the application, a digital wallet on a user device, the digital wallet comprising the virtual payment card; and
    - retrieving, with the application, data associated with the virtual payment card; and
  - verifying, with the application, that an account-holder of the card is associated with the user profile based on the card information; and
- providing, by the application, access to the second-level user account option, wherein the method is performed on the user device.

13. The method of claim 12, further comprising:
- sending, with the application, the card information and a card activation request to an account provider server;
- receiving, at the application, a status of the card activation request, the status including activated or denied, wherein an activated status of the card corresponds to the card being enabled for commercial transactions; and
- displaying, by the application, the status of the card activation request.

14. The method of claim 12, wherein receiving card information further comprises:
- communicating, using an antenna associated with the computing device, with a radio frequency identification (RFID) chip in the card using near field communication (NFC).

15. The method of claim 12, wherein receiving card information from the card further comprises:
- receiving, at the application, a public key of a key pair for the card;
- extracting, by the application, an issuer public key using a certificate authority public key;
- extracting, by the application, a public key of the key pair for the card using the issuer public key;
- instructing, with the application, the card to generate a digital signature using a private key of the key pair; and
- verifying, with the application, the digital signature using the public key.

16. The method of claim 12, wherein the second-level user account option comprises at least one of a payment transfer, a payment request, a personal identification number (PIN) change request, a card activation request, or an address change request, wherein an activated status of the card corresponds to the card being enabled for commercial transactions.

17. The system of claim 12, wherein the second-level user account options have a higher security requirement than the first-level user account options.

18. A system for multi-level user authentication, the system comprising:
- a computing device including an application and an antenna configured to communicate with a radio frequency identification (RFID) chip in a transaction card using near field communication (NFC);
- one or more processors operable to run the application; and
- a memory in communication with the one or more processors and storing instructions that, when executed by the one or more processors, are configured to cause the system to:
  - log a user onto the application by:
    - receiving a first user credential associated with a user profile of the user, the first user credential comprising at least one of: biometric data, a gesture, or a username and password combination; and
    - determining that the first user credential matches a stored second user credential;
  - display, on the application, a plurality of user account options;
  - receive, at the application, a user selection of a first-level user account option;
  - provide, via the application, access to the first-level user account option, wherein the first-level user account option includes at least of: a display of an account balance or a display of recent transactions;
  - receive, by the application, a user selection of a second-level user account option;
  - display a request to verify the identity of the user in response to the selection of the second-level user account option, wherein the second-level user account option includes one or more of: a payment transfer, a payment request, a personal identification number (PIN) change request, a card activation request, or an address change request, wherein an activated status of the transaction card corresponds to the transaction card being enabled for commercial transactions;
  - verify the identity of the user by:
    - receiving, by the application and via the antenna, card information from the transaction card; and
    - verifying, with the application, that an account-holder of the transaction card is associated with the user profile based on the card information;
  - provide, by the application, access to the second-level user account option;
  - send, with the application, the card information and the card activation request to an account provider server;
  - receive, at the application, a status of the card activation request, the status including activated or denied; and
  - display, by the application, the status of the card activation request.

19. The system of claim 18, wherein receiving card information from the transaction card further comprises:
- receiving, at the application, a public key of a key pair for the transaction card;
- extracting, by the application, an issuer public key using a certificate authority public key;
- extracting, by the application, the public key of the key pair for the transaction card using the issuer public key;
- instructing, with the application, the transaction card to generate a digital signature using a private key of the key pair; and
- verifying, with the application, the digital signature using the public key.

20. The system of claim 18, wherein the second-level user account options have a higher security requirement than the first-level user account options.

* * * * *